United States Patent
Rupp et al.

(10) Patent No.: US 6,789,215 B1
(45) Date of Patent: Sep. 7, 2004

(54) SYSTEM AND METHOD FOR REMEDIATING A COMPUTER

(75) Inventors: Vaughn E. Rupp, Overland Park, KS (US); Randall W. Robinette, Kansas City, MO (US); Darline A. Harvey, Drexel, MO (US)

(73) Assignee: Sprint Communications Company, L.P., Overland Park, KS (US)

( * ) Notice: Subject to any disclaimer, the term of this patent is extended or adjusted under 35 U.S.C. 154(b) by 0 days.

(21) Appl. No.: 09/557,046

(22) Filed: Apr. 21, 2000

(51) Int. Cl.[7] .............................................. G06F 11/00
(52) U.S. Cl. ...................... 714/38; 717/168; 717/173
(58) Field of Search ............................ 714/38; 717/172, 717/168, 173

(56) References Cited

U.S. PATENT DOCUMENTS

| | | | | |
|---|---|---|---|---|
| 5,867,714 A | * | 2/1999 | Todd et al. | 717/172 |
| 6,115,549 A | * | 9/2000 | Janis et al. | 717/172 |
| 6,205,579 B1 | * | 3/2001 | Southgate | 717/173 |
| 6,216,175 B1 | * | 4/2001 | Sliger et al. | 717/169 |
| 6,269,456 B1 | * | 7/2001 | Hodges et al. | 714/38 |
| 6,327,617 B1 | * | 12/2001 | Fawcett | 709/219 |
| 6,425,125 B1 | * | 7/2002 | Fries et al. | 717/168 |
| 6,434,744 B1 | * | 8/2002 | Chamberlain et al. | 717/168 |
| 6,453,469 B1 | * | 9/2002 | Jystad | 717/174 |
| 2003/0009753 A1 | * | 1/2003 | Brodersen et al. | |

OTHER PUBLICATIONS

Mike Foster et al., Using Tivoli Software Installation Service for Mass Installation, Jul. 1998, IBM Form No. SG24–5109–00, ISBN No. 0738400378, IBM Corporation.

\* cited by examiner

*Primary Examiner*—Scott Baderman
*Assistant Examiner*—Christopher S McCarthy

(57) ABSTRACT

A system and method for remediating a computer includes a diagnostics manager configured to analyze a computer to determine the configuration of the computer and to determine software packages that can be installed, upgraded, or deleted according to a remediation configuration. A software package manager is configured to install or upgrade software packages. A script manager is configured to monitor software packages being installed and to transmit commands to the software packages when a prompt is detected. The commands are required to complete the installation or upgrade of the software packages. A process monitoring manager monitors the progress of the remediation processes and reports the process to a log file or to a display. An optional user interface can be generated to display information relating to the remediation processes and to enable selection of options for the remediation processes.

16 Claims, 5 Drawing Sheets

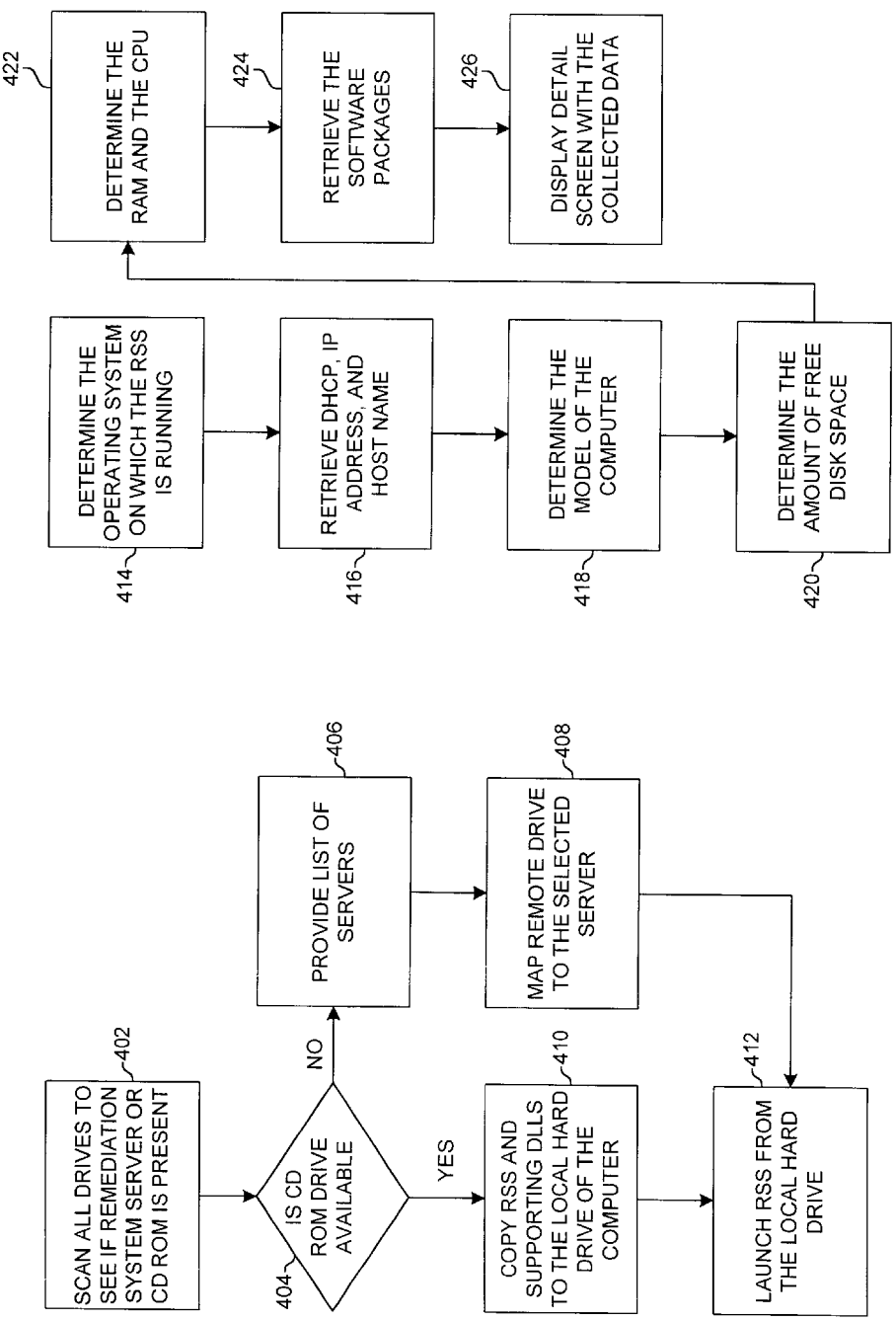

SYSTEM AND METHOD FOR REMEDIATING A COMPUTER

RELATED APPLICATIONS

Not Applicable

FEDERALLY SPONSORED RESEARCH OR DEVELOPMENT

Not Applicable

MICROFICHE APPENDIX

Not Applicable

FIELD OF THE INVENTION

The present invention relates to the field of upgrading and installing computer software for remediating a computer.

BACKGROUND OF THE INVENTION

As new software packages are created and placed on the market and as upgrades to current software packages are created, these new and upgraded software packages must be installed on computers. This installation and upgrading of software packages on computers is referred to as a remediation process. The remediation process typically is labor intensive and requires significant amounts of processing space on computer network servers. Some technologies have been developed for these network servers to initiate connections to computers to be remediated and to push upgrades or new installations of software packages to these computers. However, these "push" technologies typically do not determine specific needs of a specific computer to be remediated, do not have an efficient mechanism to selectively upgrade or install some software packages and not others or to delete unnecessary or undesired software packages. Thus, an improved system is needed to remediate computers in a manner that selectively targets software packages to be upgraded, installed, or deleted and to be able to upgrade or install software packages that have large space requirements.

SUMMARY OF THE INVENTION

The present invention is directed to a system for remediating a computer according to a remediation configuration. The system comprises a diagnostics manager configured to analyze the computer to determine a configuration of the computer and to determine if the computer configuration complies with the remediation configuration. The system further comprises a software package manager configured to manage at least one of installation, upgrade, and deletion of a software package so that the computer configuration complies with the remediation configuration. The system also has a script manager configured to generate a command required to complete at least one of the installation and upgrade of the software package upon detecting a prompt from the software package requiring entry of the command.

The present invention further is directed to a method for remediating a computer according to a remediation configuration. The method comprises analyzing the computer to determine a configuration of the computer and to determine if the computer configuration complies with the remediation configuration and managing at least one of installation, upgrade, and deletion of a software package so that the computer configuration complies with the remediation configuration. The method further comprises generating a command required to complete at least one of the installation and upgrade of the software package upon detecting a prompt from the software package requiring entry of a command.

BRIEF DESCRIPTION OF THE DRAWINGS

FIG. 4A is a block diagram of a process flow for a remediation system in accordance with an embodiment of the present invention.

FIG. 4B is a continuation of the block diagram of FIG. 4A.

DETAILED DESCRIPTION

The system of the present invention enables a user of a computer to initiate a connection to a main server via a network connection, an intranet connection, or an internet connection and remediate the user's computer. The system of the present invention enables the user to selectively upgrade or install software packages and selectively delete software packages based upon specific needs of that computer. The system of the present invention enables this selectivity by analyzing the computer configuration, determining the hardware configuration and software configuration of the computer, and determining if software packages should be upgraded or installed. The system of the present invention uses "pull" technology to enable efficient connectivity from a computer to be remediated and the remediation system and to enable large software packages to be transmitted to the computer to be remediated.

Figure 1:
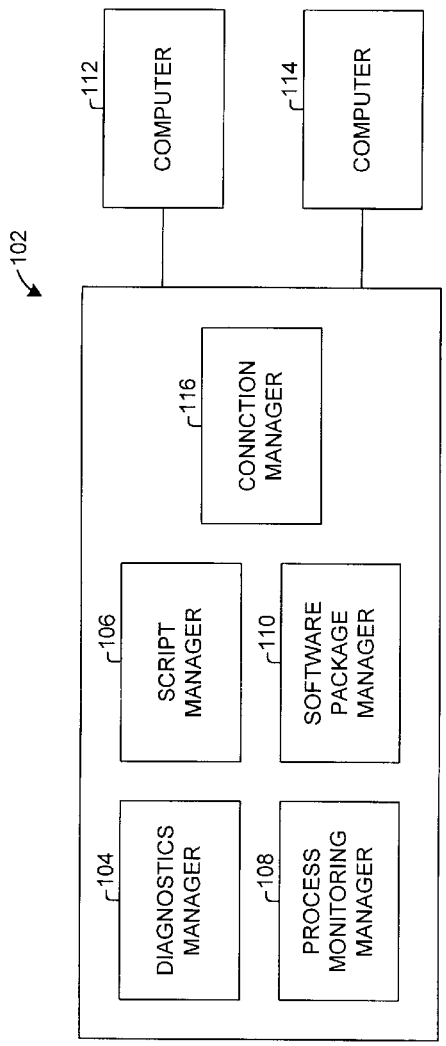
FIG. 1 is a block diagram of a remediation system in accordance with an embodiment of the present invention.

FIG. 1 illustrates an exemplary embodiment of the remediation system of the present invention. The remediation system 102 determines the hardware and software that resides on computers, i.e. the computer configuration, that connect to the remediation system. The remediation system 102 presents information identifying the resident hardware and software to a user to enable the user to select options for the computer, such as upgrades, installation, or deletion of software on or for the computer. Once the options are selected, the remediation is automated. Therefore, a user need not be present for remediation of the computer to occur. The remediation system 102 also can be configured to automatically upgrade, install, or delete software according to a pre-set remediation configuration without a user having to select options. As used herein, the term "remediate" means to fix errors in a computer configuration, upgrade software or hardware, install new software, and/or delete software.

The remediation system 102 reports installed software and version levels of installed software to assist a user in troubleshooting. The remediation system 102 reports compliance or non-compliance with remediation configuration standards for computer configurations, if the remediation configuration standards are pre-set. The remediation system 102 also creates an audit trail. The audit trail is a listing of functions performed in determining a computer's configuration and changes made to the computer configuration, such as upgrading, installing, or deleting software.

The remediation system 102 can remediate multiple computers concurrently. For example, the remediation system 102 can remediate one, ten, twenty, or more computers concurrently. This reduces the number of users or technicians needed to remediate computers, thereby reducing labor costs.

Because the remediation system 102 gathers computer configuration information, the computer configuration information can be stored for later access by other systems. Thus, the remediation system 102 also can be used as an information gathering system for all computers at a particular location.

The remediation system 102 preferably is web-based. Thus, a user of a computer can connect to the remediation system 102 using any browser via an internet or intranet (IP) connection. Therefore, the remediation system 102 does not need to be installed on the computer to be remediated, and it can be network independent. Alternately, the remediation system 102 can be server-based or run locally on a computer from a compact disk read only memory (CD ROM) drive or a disk drive.

The remediation system 102 is a "pull" technology. This means that a computer connects to the remediation system 102, options are selected, and the computer then pulls the software to be upgraded or installed from the remediation system. Using "pull" technology is an advance over using "push" technology that connects to a computer and pushes upgrades or software to the computer. The pull technology enables the remediation system 102 to install and upgrade software packages having greater size, such as mega-byte (MB) or multi-MB sized software packages. The push technology typically is used to upgrade and install smaller sized software packages. In addition, the push technology must know and store the location and addresses of all the computers to which it must connect to provide the remediation. Whereas, with the pull technology of the remediation system 102, the location and addresses of the computers need not be stored in a database or known by the remediation system. Moreover, the pull technology enables faster installation of software to a computer than standard operating system interface methods.

The remediation system 102 of FIG. 1 comprises a diagnostics manager 104, a script manager 106, a process monitoring manager 108, and a software package manager 110. The remediation system 102 can remediate multiple computers 112 and 114 concurrently. One or both computers 112 and 114 may have an optional connection manager 116.

The diagnostics manager 104 determines the computer configuration. The diagnostics manager 104 determines if the computer to be remediated has enough free hard drive space for software packages to be installed or upgraded, determines how much random access memory (RAM) is available, and determines if the computer has an associated working network connection and a working internet or intranet connection. The diagnostics manager 104 also determines the status of required system processes, whether there is available registry space for new registry entries of software packages, and the IP address, the domain name system (DNS), and the host name settings of the computer.

The diagnostics manager 104 also can perform one or more specialized diagnostics for specific software packages. Examples of specialized diagnostics include comparing the total size of an installed software package to a known good installation size to determine an indication of a good or bad installation, pinging required servers to confirm that the software package can connect to a required resource, and verifying that a user has proper permissions in the computer's operating system to use the software package. In addition, system processes can be checked for hung components, and software packages can be checked for known compatibility issues, such as installing two different antivirus software packages.

The diagnostics manager 104 determines if a software package is needed for a computer. The diagnostics manager 104 determines what software packages are installed on a computer and the versions of the installed software.

The diagnostics manager 104 may use one or more methods to determine the version of the software packages installed on the computer. The diagnostics manager 104 can check for the presence of key files and versions of those files to determine the software package identity and its version. For example, the diagnostics manager 104 can check executable (.EXE) files and dynamic link library (.DLL) files and have the .EXE and .DLL files report their version number. In addition, the diagnostics manager 104 can review the registry entries to determine if the version number is listed with the software package identification. In some instances, the diagnostics manager 104 reviews README.TXT files or other .TXT files to determine if the version number is listed therein. Alternately, the diagnostics manager 104 reviews the file size and file dates of files in a software package and compares that information with similar information from software packages to be installed or upgraded to determine the latest version.

The diagnostics manager 104 determines if there are problems with a computer configuration and if the problem can be fixed by the remediation system 102. For example, if a computer has trouble sending email, the diagnostics module 104 determines if the email software package requires an upgrade and tests the email server associated with the computer to determine if there are connectivity issues with the computer and the email server. The diagnostics manager 104 provides a description of the problem to the user and whether the remediation system 102 can fix the problem.

The script manager 106 comprises one or more scripts that can be executed to install one or more corresponding software packages. A script is a program without an interface that sends commands for an installation sequence. The script commands are directly executed by the installing software package. A script can send one or more keystrokes for an installing software package in response to a window or prompt opened by the software package requiring input for completing the installation. The script manager 106 monitors the software packages for prompts or windows and executes scripts with the prompts or windows are detected. A script is associated and executed for each software package to be installed.

The process monitoring manager 108 monitors remediation operations carried out by the remediation system 102, verifies whether a remediation operation is successful or not successful, and reports the progress of the remediation operations. For example, if a software package is being installed on a computer, the process monitoring manager 108 monitors the installation, notifies the user if the installation completed successfully, or notifies the user if a problem occurred in the installation, a description of the problem, and how the problem can be corrected. The notification can be by writing the information to log or by generating the information for display on a monitor.

If a problem occurs in the installation or upgrade, the process monitoring manager 108 can be configured to prompt a user to continue or to abort the process. An error may occur, for example, if a directory to which software is being installed or upgraded is a read-only directory. In that example, files to be upgraded cannot be deleted, and new files to be installed cannot be written to the directory.

The software package manager 110 manages the installation of one or more software packages. The software package manager 110 comprises one or more software packages that can be installed and/or one or more upgrades for software packages.

The computers 112 and 114 are any processor capable of operating a software package. The computers 112 and 114 may include volatile and non-volatile memory. The computers 112 and 114 may comprise a browser in some configurations.

The connection manager 116 creates a drive mapping to a server for the remediation system 102, connects to the remediation system, and initiates the remediation. The connection manager 116 operates as an invisible service and can execute itself during off hours, such as at night.

The connection manager 116 can be configured to measure traffic loads and bandwidth capacities of connections between the computer on which it resides and a server for the remediation system 102. The connection manager 116 stores this information as a virtual traffic map and uses the virtual traffic maps to determine an optimal time to connect to the remediation system 102. Such an optimal time may be before a load is placed on the remediation system from other sources, before a greater amount of bandwidth use is anticipated, or before a set time frame, such as when a business day begins. The connection manager 116 is an optional module that can be loaded on one or more of the computers 112 or 114.

The system of FIG. 1 operates as follows. In a first example, the remediation system 102 does not have a connection manager 116. In this example, an administrator has determined that any computer connecting to the remediation system 102 will be remediated according to a predefined remediation configuration. The remediation configuration identifies software packages that must be loaded, software packages that may be upgraded but are not required, and software packages that may not reside on the computer and should be deleted.

In this example, a user of the computer 112 connects to the remediation system 102 via an IP connection. In this example, the IP connection is an intranet connection.

When the computer 112 connects to the remediation system 102, executable files and scripts necessary to complete an installation, an upgrade, or a deletion of a software package are downloaded to the computer 112. Other files that may be used to generate a user interface or log files on the computer 112 also are downloaded to the computer.

The diagnostics manager 104 analyzes the software and the hardware of the computer 112 and determines if the computer is in compliance with the remediation configuration. In this instance, the diagnostics manager 104 examines the registry of the computer 112 to determine which software packages and versions of the software packages are resident on the computer.

A configuration and option window is generated to the user of the computer 112. The configuration and option window may be in the form of the user interface of FIG. 2. Although, other configuration and option windows may be used. The configuration and option window identifies the hardware and software configuration of the computer 112, specifies the software packages and the versions of the software packages that currently are installed on the computer, lists other software packages that may be installed or upgraded on the computer, and generates a select box or other selection mechanism so that a user of the computer can select whether to install or upgrade additional software packages.

After a user has selected the software packages to be installed and/or upgraded, the software package manager 110 initiates the installation or upgrade of the selected software packages. In this example, the software package manager 110 initiates execution of the script manager 106. It will be appreciated that in other configurations, the software package manager 110 does not initiate execution of the script manager 106, and the script manager is self-executing upon determining that the software package manager 110 has initiated an installation or upgrade.

As the software package manager 110 installs and/or upgrades one or more software packages, the script manager 106 executes scripts that transmit commands required for installation or upgrade of the software packages. For example, in one instance the script manager 106 transmits key strokes that operate as entries for a prompt by the installing software package required for an option that must be selected to complete the installation. The script manager 106 monitors the installing software package to determine when a prompt is generated from the software package and to determine when a command, such as a series of key strokes, must be generated to complete the installation process.

While the software package manager 110 and the script manager 106 operate to complete the installation or upgrade of the selected software packages, the process monitoring manager 108 monitors the installation or upgrade process to determine if the installation or upgrade successfully completes or is not successful. The process monitoring manager 108 generates information that can be displayed to the user of the computer 112 identifying whether the installation or upgrade was successful or not successful. For example, the process monitoring manager 108 can generate to the computer 112 information identifying the hardware configuration of the computer, when a repair process is started, when a download of scripts to the computer occurs, when deletion of files from the computer begins, when unnecessary files have been deleted, when an upgrade of a software package is initiated and if that upgrade is successful, when a new software package is installed and whether the installation was successful, when the remediation is complete, and how much additional space was used on a hard drive on the computer. This information also can be generated to a log file created on the computer 112. In alternate configurations, either one or both of the log file or the display need not be generated.

When the remediation process is completed, the process monitoring manager 108 deletes any scripts or other files of the remediation system 102 from the computer 112. Thus, no additional hard drive space is taken on the computer 112 for executable files or other files of the remediation system 102. In this example, before the executable files and the scripts are deleted from the computer 112, the current computer configuration is transmitted to the remediation system 102 for storage and later referral. In this example, the remediation system 102 installed four software packages in less than one minute.

It will be appreciated that the computer 112 initiated the connection to the remediation system 102 to complete the remediation process. The computer 112 pulled the software packages to be installed or upgraded from a server on which the remediation system 102 resides.

In another example, a connection manager 116 is loaded to the computer 112 and the computer 114. The connection manager 116 determines an optimal time to connect to the remediation system 102 to initiate a remediation. In this example, the connection manager 116 on each of the computers 112 and 114 determines that the optimal time is midnight.

At midnight, the connection manager 116 on each of the computers 112 and 114 initiates a connection to the remediation system 102 over an IP connection. When the computers 112 and 114 connect to the remediation system 102, executable files and scripts necessary to complete the installation, upgrade, or deletion of software packages are downloaded to the computers. An administrator previously had defined a remediation configuration for any computer connecting to the remediation system 102.

The remediation system 102 concurrently remediates both computers 112 and 114. The diagnostics manager 104 analyzes the computers 112 and 114 to determine the computer hardware and software configurations. The diagnostics manager 104 determines the software packages that are installed on the computers 112 and 114 and the versions of the software packages. In this example, the diagnostics manager 104 reads the registry entries on both computers 112 and 114 to determine the versions of the software packages. In addition, the diagnostics manager 104 checks the .DLL files and the .EXE files to obtain version numbers for the software packages. In addition, since some software packages do not have version numbers identified in the registry or the .DLL or .EXE files, the diagnostics manager 104 reviews the file size and file date of selected files in the remaining software packages to determine their versions.

The diagnostics manager 104 compares the version identifications of the software packages residing on the computers 112 and 114 with the allowable remediation configuration. For those software packages residing on the computers 112 and 114 that do not comply with the remediation configuration, the diagnostics manager initiates the installation, upgrade, or deletion of software packages.

In this example, the diagnostics manager 104 deletes files for software packages that should not reside on the computers 112 and 114. The software package manager 110 initiates an upgrade for particular software packages and an installation of new software packages on each of the computers 112 and 114. The script manager 106 monitors the software package manager 110 to determine when a script must be executed for a particular installation or upgrade of a software package. The script manager 106 generates commands, such as a series of key strokes, as an entry for the software package installation or upgrade when a prompt is detected.

While the software packages are being installed, the process monitoring manager 108 monitors the installation process to determine if the installation or upgrades are successful or not successful. In addition, the process monitoring manager 108 generates to a log file on each of the computers 112 and 114 each process that is executed for the remediation. For example, the process monitoring manager 108 writes to a log file for each of the computers 112 and 114, respectively, the host name, the IP address, the model of that computer, the CPU of that computer, and the hard drive space available for that computer. In addition, the process monitoring manager 108 writes to the log file for each of the respective computers 112 and 114 when the remediation process for a repair starts, when files are deleted, when an installation or upgrade of a software package is initiated and whether that installation or upgrade was successful, when the remediation is complete, and how much hard drive space is available at the end of the remediation.

When the remediation process is completed, any scripts or other files of the remediation system are deleted from each of the computers 112 and 114. Thus, no additional hard drive space is taken on the computers 112 and 114 for executable files or other files from the remediation system 102. In this example, the remediation system 102 deleted three software packages, upgraded five software packages, and installed two software packages on each of the computers 112 and 114.

It will be appreciated that no information was generated for a user interface in this example. The configuration information was generated to a log file. In addition, it will be appreciated that the computers 112 and 114 pulled the software packages to be installed or upgraded from a server from which the remediation system 102 resides.

Figure 2:
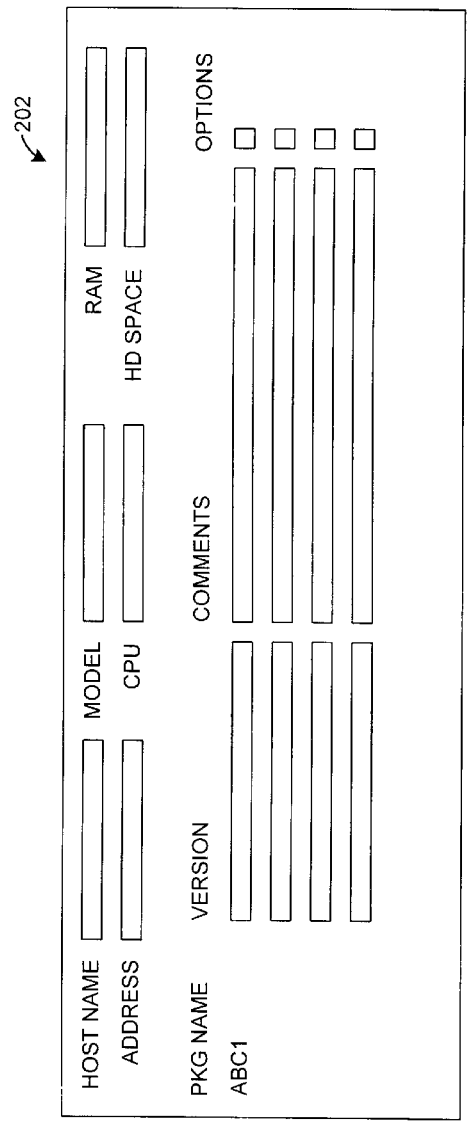
FIG. 2 is a block diagram of a user interface for a remediation system in accordance with an embodiment of the present invention.

FIG. 2 illustrates an exemplary embodiment of a user interface 202 for the present invention. The user interface 202 generates configuration information to a user and enables a user to select options for remediation of a computer. The user interface 202 generates information identifying hardware and software configurations for the computer to be remediated.

In the example of FIG. 2, the user interface 202 generates the host name of the computer, the IP address of the computer, the model of the computer, the central processing unit (CPU) of the computer, the available RAM, and the hard drive (HD) space that is available on the computer.

In addition, the user interface 202 generates information for a remediation configuration that was preset for the computer. For example, an administrator may determine that specific software packages are to be installed for all computers in an area. When a user connects to the remediation system 102, the remediation system determines the software packages loaded on the computer and generates a user interface 202 identifying the software packages along with the version numbers of the software packages.

In addition, for the particular remediation configuration of this example, the user interface 202 generates information identifying those software packages that are not installed on the computer and should be installed as well as software packages that should be upgraded or deleted according to the remediation configuration. The user interface 202 generates comments for each software package identifying whether the package is installed, is not installed, requires an upgrade, requires a manual installation, requires an automatic installation, or requires that the software package cannot be installed. Other comments that enable a user to complete the remediation configuration can be included.

In addition, the user interface 202 generates select boxes that enable a user to select whether the software package will be installed or not installed. In the example of FIG. 2, the select boxes are labeled as options. For those software packages that may not be installed according to a remediation configuration, the options check boxes for those software packages are grayed out and cannot be selected.

Figure 3:
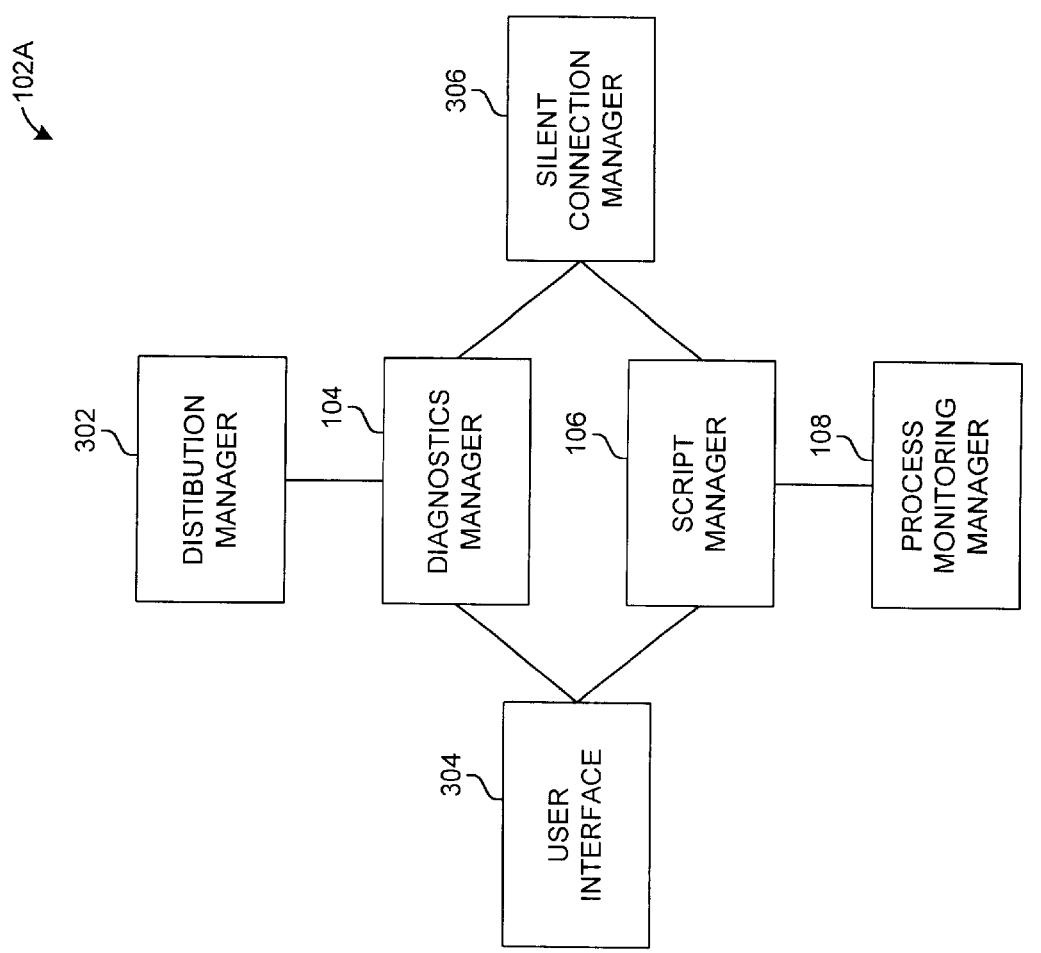
FIG. 3 is a block diagram of another remediation system in accordance with an embodiment of the present invention.

FIG. 3 illustrates another exemplary embodiment of the remediation system of the present invention. The remediation system 102A of FIG. 3 comprises a distribution manager 302, a user interface 304, and a silent service manager 306. In addition, the remediation system 102A comprises the diagnostics manager 104, the script manager 106, and the process monitoring manager 108 of FIG. 1.

The distribution manager 302 comprises one or more methods of distributing connectivity to or implementation of the remediation system 102A. The distribution manager 302 may include one or more of an IP connection to the remediation system 102A, a CD ROM having the remediation system, a drive mapping system such as the connection manager 116 of FIG. 1, or some other miscellaneous pull technology.

The user interface 304 reports findings of the diagnostics manager 104 to a user and allows the user to select options. The user interface 304 is optional.

The silent connection manager 306 determines which software packages require upgrading based on a predefined remediation configuration set by a user. The silent service manager 306 can be configured to automatically perform the required upgrade or to enable a user to select an option for performing the upgrade.

The system of FIG. 3 operates as follows. A distribution method is selected from the distribution manager 302. In this example, an IP connection is selected to connect to the remediation system 102A. The diagnostics manager 104 analyzes a connecting computer to determine the computer's configuration. The diagnostics manager 104 determines the hardware configuration and determines what software packages are installed on the computer and the versions of the installed software packages. In this example, the silent connection manager 306 is used to determine what software packages are to be upgraded or installed according to a pre-defined remediation configuration.

After the silent connection manager 306 determines what software packages are to be upgraded and installed, the script manager 106 operates in conjunction with the software package manager (not shown) to load and execute selected scripts in a logical order, one after the other, until all required software packages are installed. The process monitoring manager 108 monitors the remediation process, verifies that each software package was installed or upgraded properly, and writes the results of the remediation process to a log file.

It will be appreciated that the user interface 304 is used in other examples. When used, the user interface 304 reports the remediation processes to a generated display and allows a user to select which software packages should be upgraded or installed.

Figure 4C:
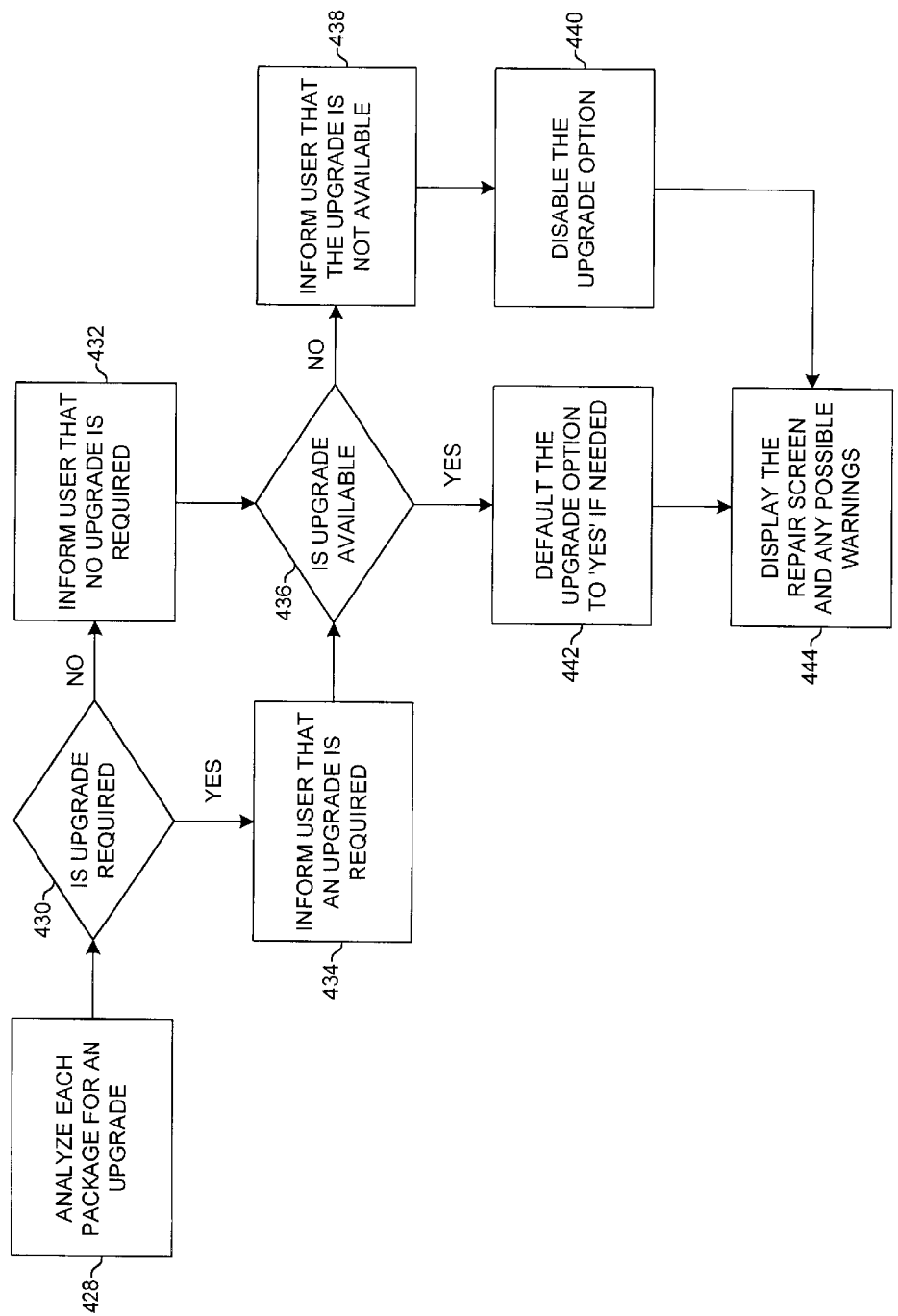
FIG. 4C is a continuation of the block diagram of FIG. 4B.
Figure 4D:
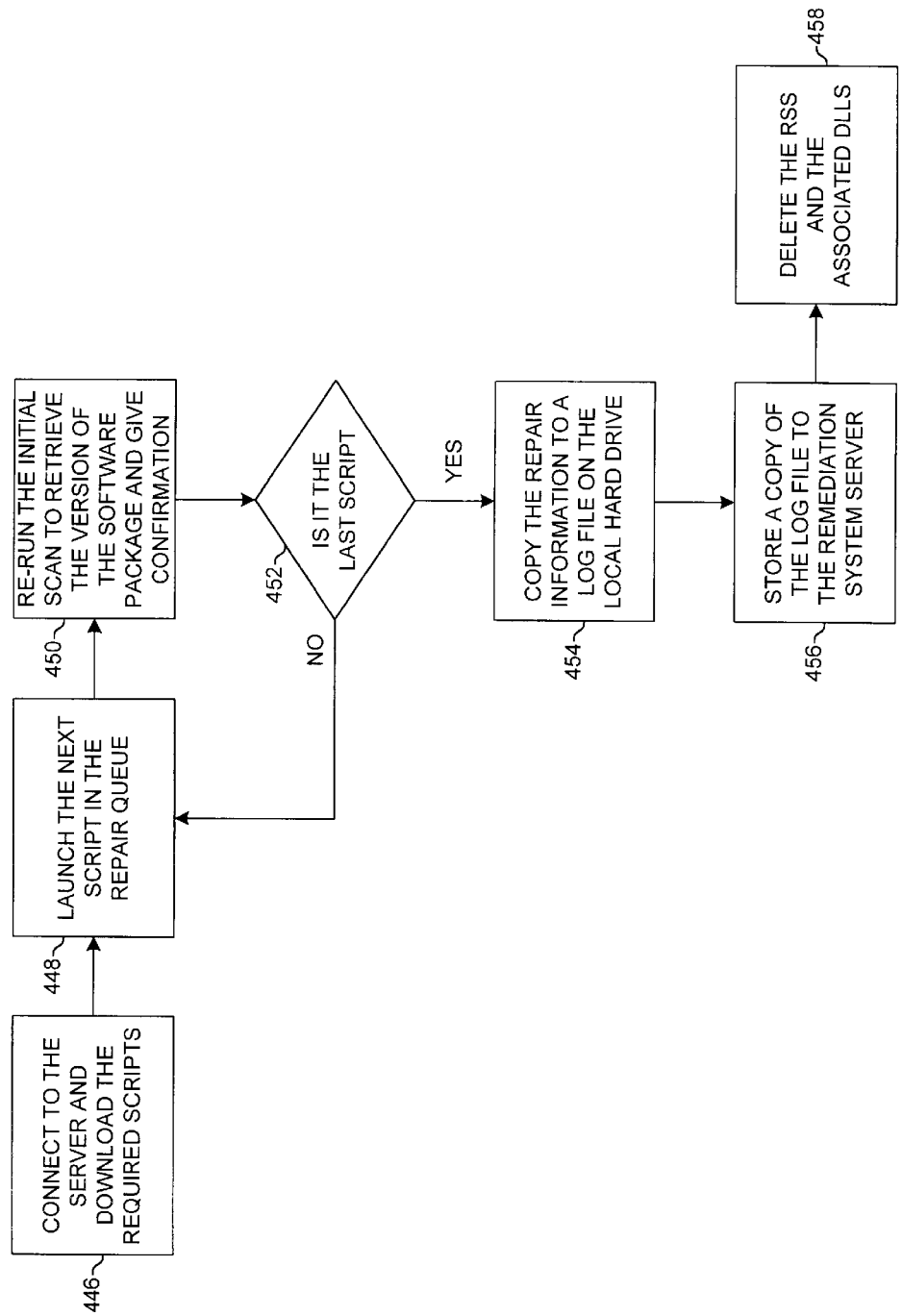
FIG. 4D is a continuation of the block diagram of FIG. 4C.

FIGS. 4A–4D depict an exemplary embodiment of the operation of a remediation system. When a computer connects to the remediation system, the computer accesses the remediation system software (RSS). The remediation system scans all drives of the computer to see if a remediation system server or a CD ROM is present at step 402 (FIG. 4A). If a CD ROM or drive is not available at 404, a list of remediation system servers is provided to the user at 406, and the remote drive of the computer is mapped to a selected server at 408. After step 408 or if a CD ROM or drive is available at step 404, the RSS and the supporting .DLLs are copied to the local drive of the computer at 410. Then, the RSS is launched from the local hard drive at 412.

The operating system type is determined at 414 (FIG. 4B). The dynamic host-configuration protocol (DHCP), the IP address, and the host name are retrieved at 416. The model of the computer is determined at 418, and the amount of free disk space on the local drive is determined at 420. The RAM and the CPU types are determined at 422. The software packages to be installed or upgraded are retrieved at 424, and a detail screen identifying the collected data is displayed to a user at 426. It will be appreciated that the display screen is optional.

Each software package is analyzed to determine if an upgrade is needed at 428 (FIG. 4C). If the software package does not require an upgrade at 430, the user is informed that no upgrade is required at 432. If the package does require an upgrade at 430, the user is informed that an upgrade is needed at 434.

If the upgraded software package is not available at 436, the user is informed that the upgrade is not available at 438, and the upgrade option is disabled at 440. If the upgrade software package is available at 436, the upgrade option is defaulted to "Yes", if needed at 442. After step 440 or step 442 the repair screen and any possible warnings are disabled at 444

The computer is connected to the remediation system server, and the required scripts are downloaded at 446. The script in the repair queue then is launched at 448. The initial scan to retrieve the version number of the software package is re-run and confirmed at 450. If the script that was run is not the last script in the repair queue at 452, the next script in the repair queue is launched at 448. If the script that was run was the last in the repair queue at 452, the repair information is copied to a log file on the local drive of the computer at 454. A,copy of the log file is stored on the remediation system server at 456, and the RSS with its associated .DLLs are deleted from the local drive of the computer at 458.

Those skilled in the art will appreciate that variations from the specific embodiments disclosed above are contemplated by the invention. The invention should not be restricted to the above embodiments, but should be measured by the following claims.

What is claimed is:

1. A system operable for remediating at least one second computer according to a remediation configuration upon connecting the second computer to a first computer, the system comprising:

a diagnostics manger configured to analyze the second computer to determine a configuration of the second computer, to determine if the second computer configuration complies with the remediation configuration, and, if not in compliance, to determine at least one process for at least one software package for placing the second computer configuration into compliance, the process comprising at least one member of a group comprising installing, upgrading, and deleting the at least one software package;

a software package manager configured to automatically initiate the process for the at least one software package upon determination of the process by the diagnostics manager;

a script manager configured to monitor the process and, upon detecting at least one prompt generated for the at least one software package requiring at least one command for completing the process, automatically generating the at least one command; and a distribution manager configured to automatically load the software package manager and the script manager to the second computer after connecting the second computer to the fist computer so that the software package manager and the script manager are operable on the second computer.

2. The system of claim 1 wherein the system is configured to remediate the second computer and at least one third computer concurrently.

3. The system of claim 1 wherein the diagnostics manager is configured to determine if the second computer configuration complies with the remediation configuration by identifying at least one version identification of the at least one software package and by comparing the at least one version identification to the remediation configuration, the at least one version identification comprising at least one member of a group comprising a registry entry on the second computer identifying the at least one software package, a text (.TXT) file on the second computer identifying the at least one software package, a version number for the at least one software package, a size of the at least one software package, and a date of the at least one software package.

4. The system of claim 1 further comprising a process monitoring manager configured to monitor the process and to vary whether or not the process is successful.

5. The system of claim 1 further comprising a connection manager configured to connect the second computer to the first computer and to initiate remediation of the second computer.

6. The system of claim 5 wherein the connection manager further is configured to determine an optimal time to connect the second computer to the first computer to initiate remediation and to connect the second computer to the first computer at the optimal time.

7. A method operable for at least one remediation system remediating at least one non-compliant computer according to a remediation configuration, the method comprising:
  connecting the non-compliant computer to the remediation system;
  analyzing the non-compliant computer to determine a configuration of the non-complian; computer,
  determining if the non-compliant computer configuration complies with the remediation configuration, and, if not in compliance, determining at least one process for at least one software package for effecting compliance for the non-compliant computer configuration, the process comprising at least one member of a group comprising installing, upgrading, and deleting the at least one software package;
  automatically loading a script manager comprising at least one script from the remediation system to the non-compliant computer for the process after connecting the non-compliant computer to the remediation system;
  initiating the process; and
  monitoring the process with the script manager and, upon detecting at least one prompt generated for the at least one software package requiring at least one command for completing the process, automatically executing the at least one script for generating the at least one command.

8. The method of claim 7 further comprising generating a user interface for display, the user interface identifying the non-compliant computer configuration and enabling selection of the process.

9. The method of claim 7 wherein generating the at least one command comprises generating a plurality of key strokes that operate as an entry for the prompt to the at least one software package for completing the process.

10. The method of claim 7 further comprising deleting the script manager comprising the at least one script from the non compliant computer when the process is complete.

11. The method of claim 7 further comprising remediating the non-compliant computer and at least one second non-compliant computer concurrently.

12. The method of claim 7 wherein determining if the non-compliant computer configuration complies with the remediation configuration comprises:
  identifying at least one version identifier for the at least one software package selected from at least one member of a group comprising a registry entry on the non-compliant computer identifying the at least one software package, a text (.TXT) file on the non-compliant computer identifying the at least one software package, a version number for the at least one software package, a size of the at least one software package, and a date of the at least one software package; and
  comparing the version identifier with the remediation configuration.

13. The method of claim 7 wherein the connecting step comprises determining an optimal time to connect the non-compliant computer to the remediation system to initiate radiation and connecting the non-compliant computer to the remediation system at the optimal time.

14. A method for remediating at least one non-compliant computer according to a remediation configuration, the method comprising:
  identifying a device configured with remediate software, wherein the remediating software comprises a diagnostics manager, a software package manager, a script manager comprising at least one script, and an identification of the remediation configuration, and wherein the device is selected from at least one member of a group comprising a remediating computer and a media operable for a media device of the non-compliant computer;
  making a connection between the device and the non-compliant computer and operating the remediating software from the device;
  analyzing the non-compliant computer with the diagnostics manager to determine a configuration of the non-compliant computer;
  determining if the non-compliant computer configuration complies with the remediation configuration, and, if not in compliance, determining at least one process for at least one software package for effecting compliance for the non-compliant computer configuration the process comprising at least one member of a group comprise installing, upgrading, and deleting the at least one software package;
  automatically loading the at least one script from the device to the non-compliant computer for completing the process;
  initiating the process from the software package manager upon determination of the process by the diagnostics manager; and
  monitoring the process with the script manager and, upon detecting at least one prompt generated for the at least one software package requiring at leas one command for completing the process, automatically executing the at least one script for generating the at least one command.

15. The method of claim 14 further comprising determining a plurality of processes for a plurality of software packages for effecting compliance of the non-compliant computer, initiating the plurality of processes, and executing a plurality of scripts for generating a plurality of commands required for completion of the plurality of processes for the software packages.

16. The method of claim 15 further comprising loading the plurality of scripts to the non-compliant computer before initiating the plurality of processes, executing the plurality of scripts from the non-compliant computer, and deleting the plurality of scripts from the non-compliant computer after the plurality of processes are complete.

* * * * *